United States Patent

[19] Patriquin

[11] 3,978,764
[45] Sept. 7, 1976

[54] AUTOMATIC KEY DUPLICATING APPARATUS

[75] Inventor: George P. Patriquin, Gardner, Mass.

[73] Assignee: Hudson Lock, Inc., Hudson, Mass.

[22] Filed: Nov. 29, 1974

[21] Appl. No.: 528,222

Related U.S. Application Data

[62] Division of Ser. No. 394,500, Sept. 5, 1973, Pat. No. 3,865,011.

[52] U.S. Cl. .............................. 90/13.05; 269/228
[51] Int. Cl.² ........................................... B23C 1/16
[58] Field of Search .................... 90/13.05; 269/228

[56] References Cited
UNITED STATES PATENTS

| | | | |
|---|---|---|---|
| 2,467,575 | 4/1949 | Stolove et al. | 90/13.05 |
| 3,442,174 | 5/1969 | Weiner et al. | 90/13.05 |
| 3,602,092 | 8/1971 | Richens | 90/13.05 |
| 3,834,688 | 9/1974 | Richens et al. | 90/13.05 X |

Primary Examiner—Othell M. Simpson
Assistant Examiner—Z. R. Belinsky
Attorney, Agent, or Firm—John E. Toupal

[57] ABSTRACT

Disclosed is a key making machine with a sample vise for receiving and retaining a sample key to be duplicated and a blank vise for receiving and retaining a key blank. When the sample key is positioned properly a path of electrical conduction is provided through it. A similar conductive path is established through the key blank when it is properly positioned. A series circuit through the key and blank prevents operation of the machine if the sample key or key blank is not properly positioned. During each cycle of operation, a support table completes one cycle of reciprocating linear motion. Toggles responsive to the motion of the table close the vises shortly after the table begins to move. Positioning towers near the vises support slidably mounted rigid fingers that project toward the vises to aid in the positioning of the key and the blank. Following closure of the vises, the towers respond to the motion of the table and move to a standby position to facilitate the cutting operation. Tower motion is linear and transverse to both table motion and finger projection. A cutter motor is mounted on the table with its shaft parallel to the direction of table motion. A coupling system couples the cutter motor to a cutter wheel and allows the axle of the wheel to move in a circular path about a drive shaft that is parallel to the cutter motor shaft. Motion of the cutter wheel with respect to the cutter motor is in response to a stylus that scans the bitted pattern of the sample key as the table reciprocates.

6 Claims, 23 Drawing Figures

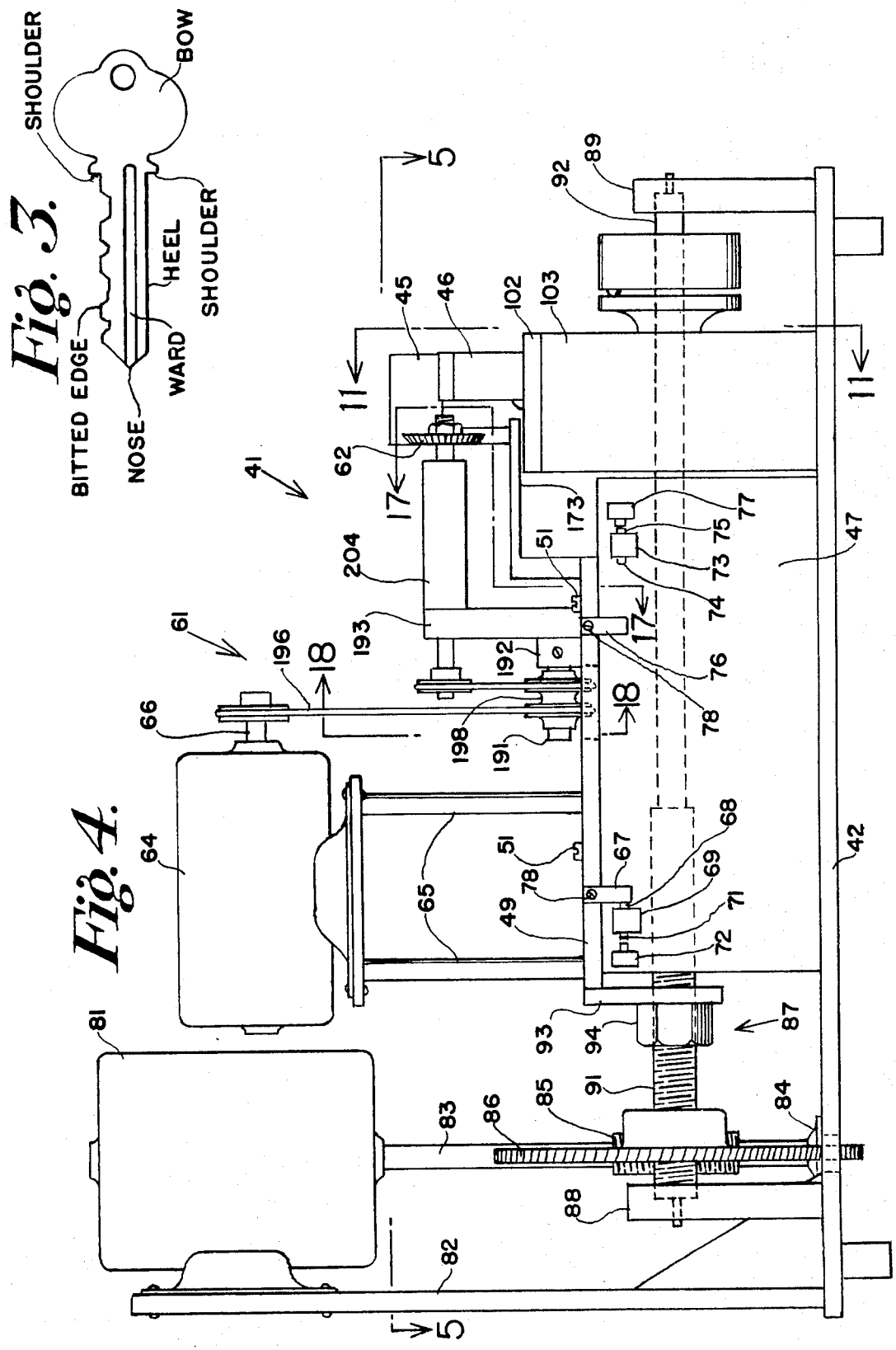

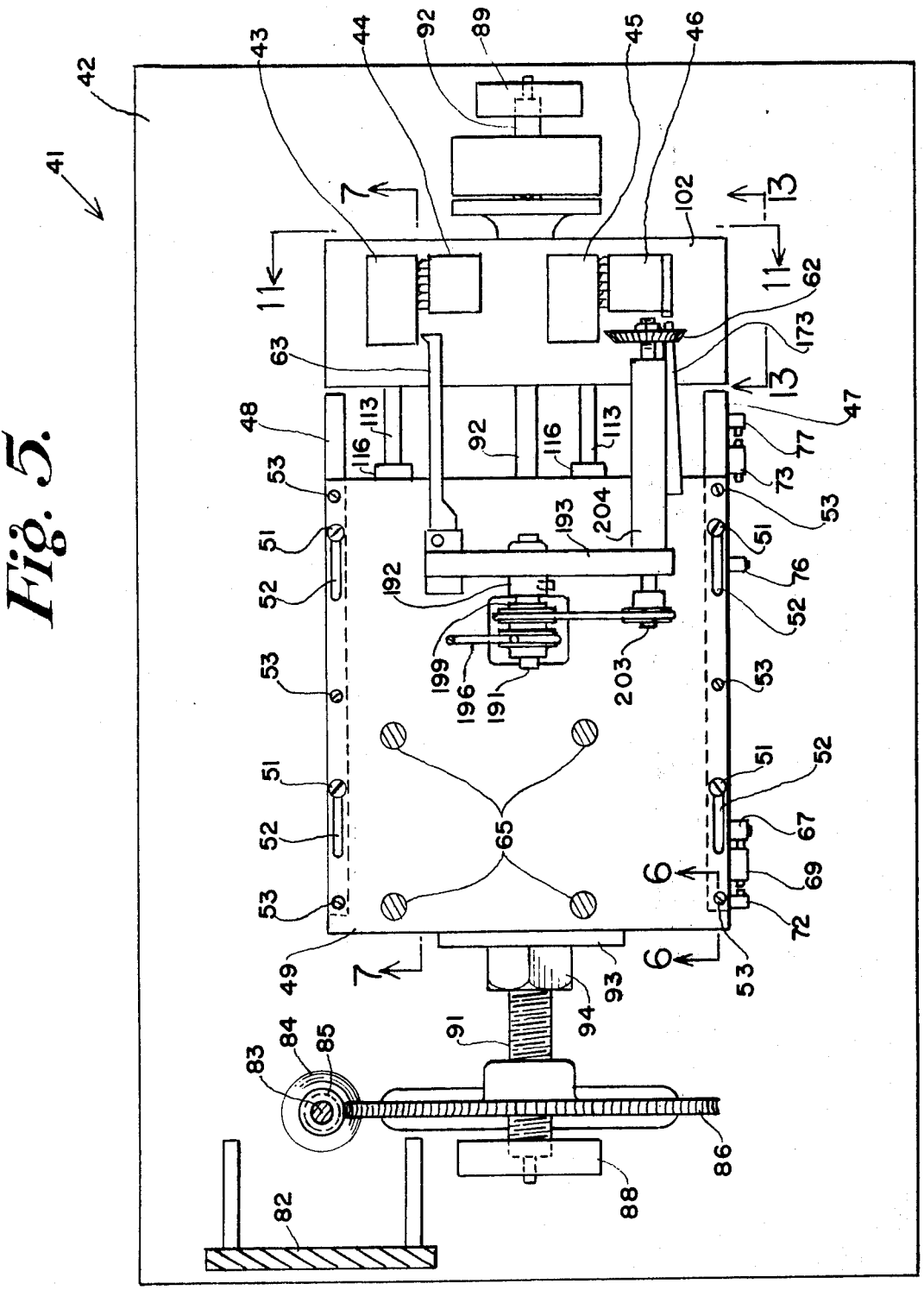

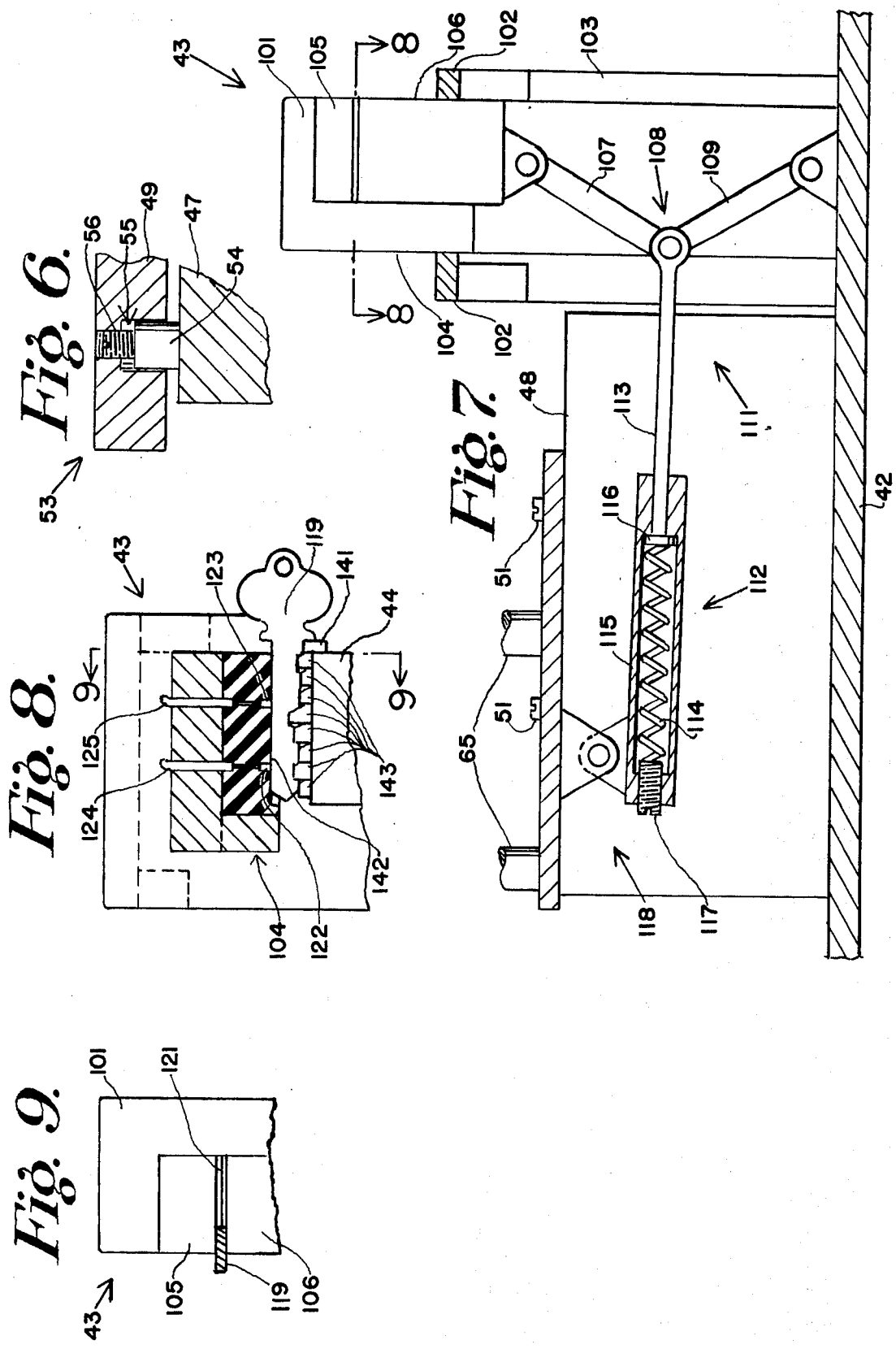

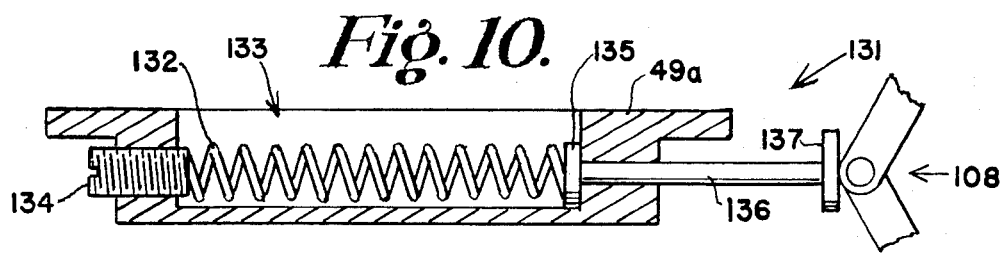
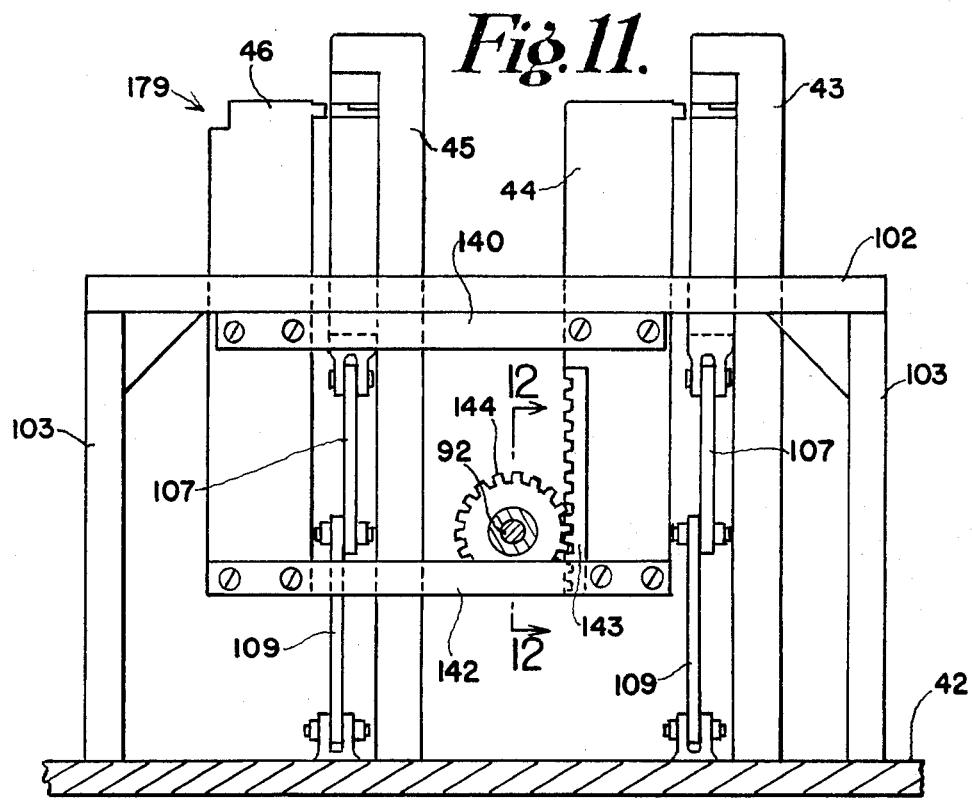
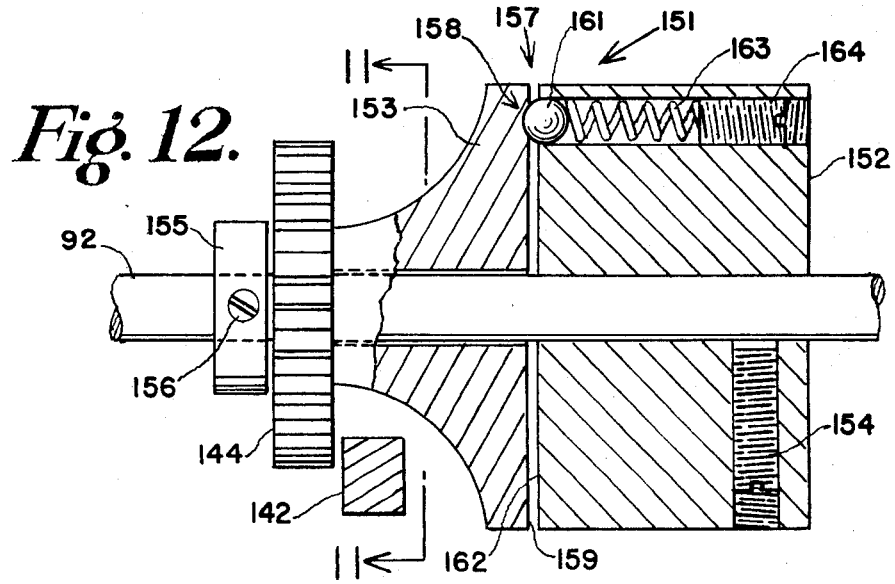

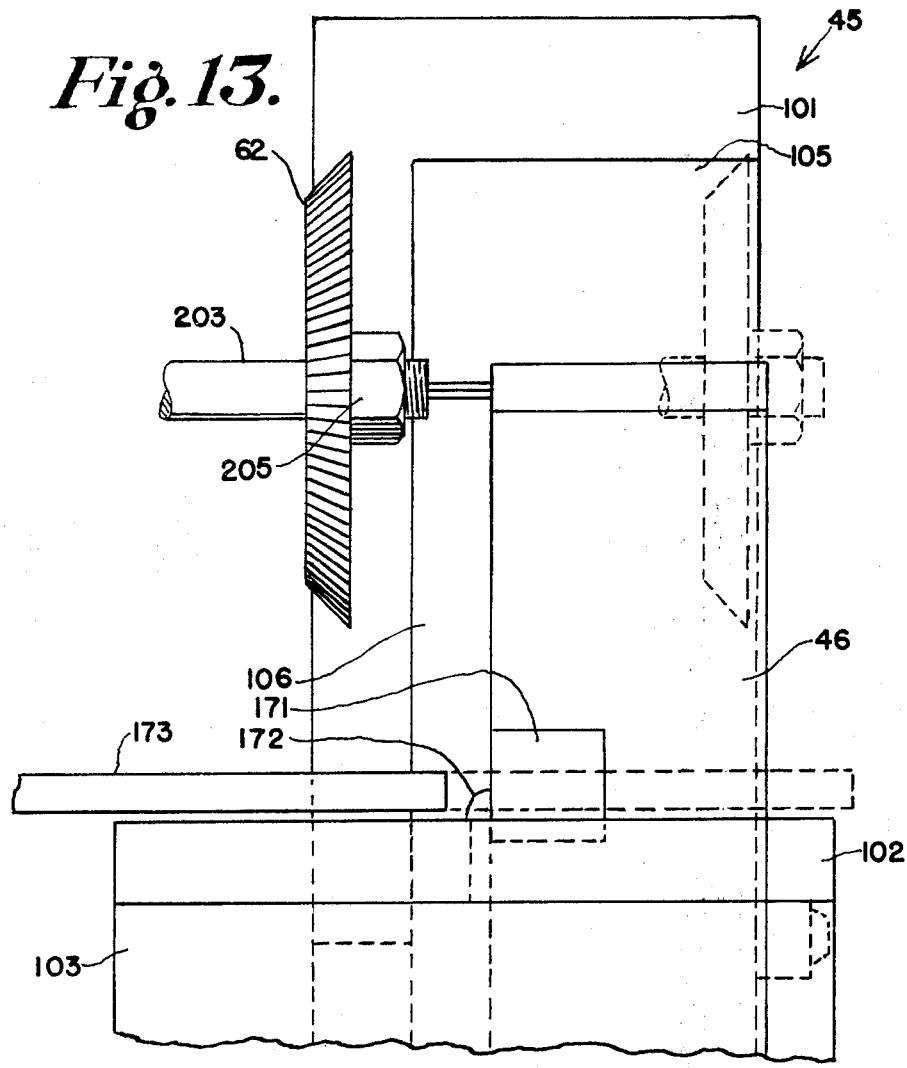
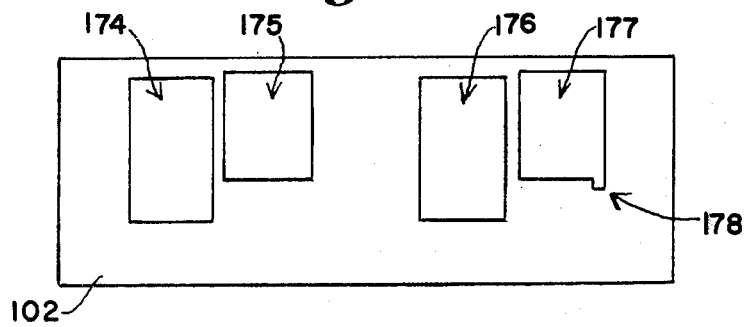

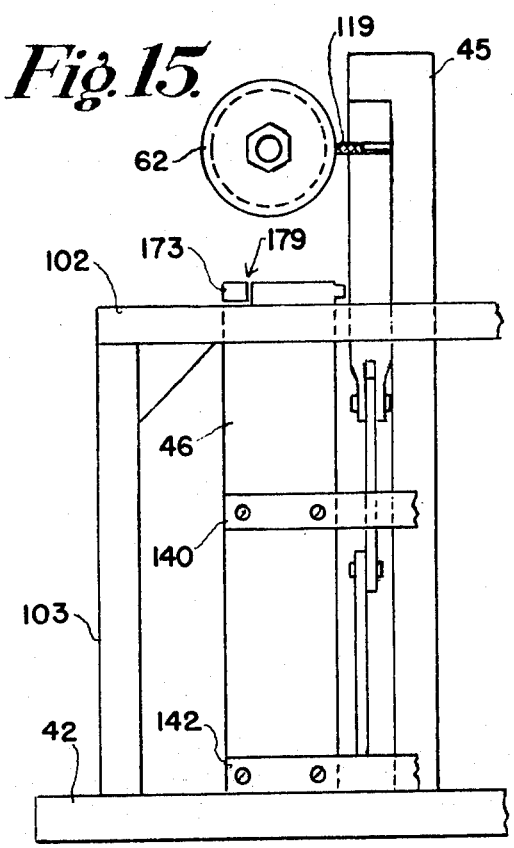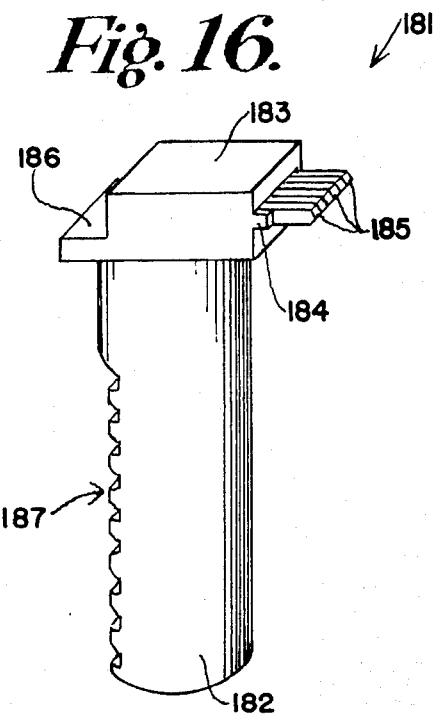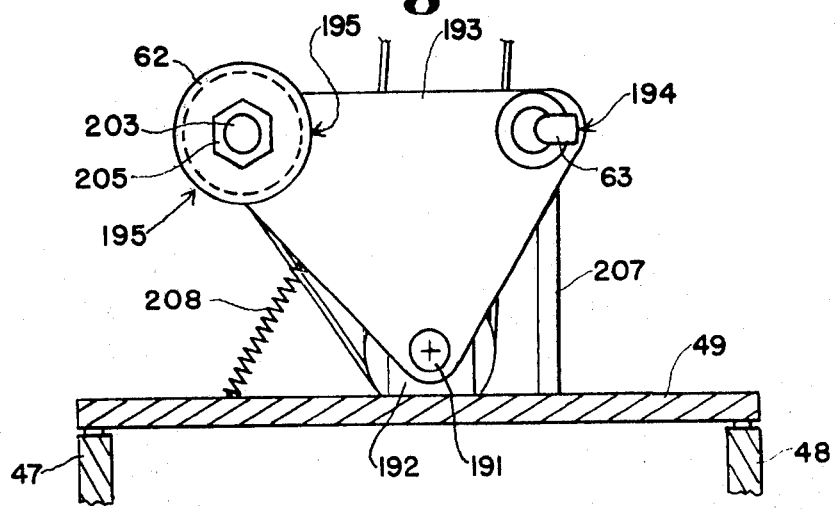

AUTOMATIC KEY DUPLICATING APPARATUS

CROSS-REFERENCE TO RELATED APPLICATION

This invention is a division of my co-pending U.S. Application Ser. No. 394,500 filed Sept. 5, 1973, now U.S. Pat. No. 3,865,011, entitled "Automatic Key Duplicating Apparatus".

BACKGROUND OF THE INVENTION

This invention relates to key duplicating machines and, more particularly, to automatic key duplicating machines amenable to coin controlled operation.

Several forms of key duplicating machines are known. The most widely used of these machines are quite simple and greatly rely on the skill of the machine operator during the duplication process. Clearly such machines are not automatic and are not suitable for operation in customer controlled or coin operated applications.

Previous attempts have been made to automate key making machines. However, the added number of working parts previously required to render the machines automatic and eliminate the need for a skilled operator made most prior automatic models too expensive to be widely accepted and so complex as to be prone to breakdown. Furthermore, most known automatic key duplicating machines were not sufficiently "foolproof" in the hands of an unskilled operator. For example, many prior models relied on a certain degree of dexterity and care on the part of an operator to properly position the sample key and key blank. Often, however, a customer of a self-service machine was unable or too inattentive to provide proper positioning with the result that the "duplicate" key provided was dysfunctional.

Other prior machines worked as laboratory models but were not suited for actual public operation. For example, sample keys that were of an unusual thickness or slightly bent could not be accommodated.

The object of this invention, therefore, is to provide a reliable automatic key making machine that can be successfully operated by inattentive or unskilled persons and can be manufactured at a low cost.

SUMMARY OF THE INVENTION

This invention is characterized by an automatic key duplicating machine including a sample vise for receiving and retaining a sample key and a blank vise for receiving and retaining a key blank. A stylus responsive cutter is mounted on a movable support table that is in turn mounted on a linear track so that the support table reciprocates one dimensionally during the cutting cycle. Clamping apparatus is provided to close the vises upon the initiation of a cutting cycle and a positioning system is included to aid in properly positioning the sample key and key blank in the vises prior to the activation of the clamping system. The positioning system is removed from the vicinity of the vises following clamping. Both the clamping apparatus and the positioning system are mechanically controlled by the movement of the support table. The entire machine is therefore of simple construction and inexpensive to manufacture. Furthermore, the electrical control circuitry is substantially simplified and the number of parts is greatly reduced so that breakdowns are less of a problem than in prior automatic key duplicating machines. However, inasmuch as the scanning movement of the cutter and stylus combination, the removal of the positioning system and the clamping of the vises all occur in response to motion of the support, positive synchronization thereamong is assured. The subject key duplicating machine is readily usable as a coin operation key duplicating machine because no operator skill is required and the machine is extremely efficient and reliable in operation.

A feature of the invention is a coupling system that coupled the stylus and the cutter to the moving support table so that the stylus and cutter move in a direction other than the direction of the one dimensional motion of the table. The coupling system includes an axle and the stylus and cutter follow circular paths therearound. A cutter motor is mounted on the support table. A cutter drive shaft coupled to the cutter motor supports a drive pulley with the center of the pulley aligned with the center point of the axle. A cutter arm extending from the axle supports a cutter wheel and a cutter pulley in driving engagement. A drive belt couples the drive pulley and the cutter pulley for rotating the cutter wheel in response to the cutter motor. As the cutter wheel and the cutter pulley follow circular paths about the axle, the separation between the cutter pulley and the drive pulley remains constant and thus the drive belt tension remains constant. A stylus arm couples the cutter wheel and the stylus so that the cutting point at which the wheel intersects the key blank is at the same radius from the center point of the axle as is the contact point of the stylus. Consequently, motion of the stylus, as it scans the sample key during the reciprocating motion of the table, is precisely duplicated by the cutter wheel and thus the bitted pattern of the sample key is duplicated in the key blank. Inasmuch as the cutter motor is firmly mounted on the support and moves one dimensionally therewith, all that moves in response to the stylus is the stylus itself and the cutter wheel and cutter pulley assembly and the associated mounting components. Consequently, the stylus responsive system is of very low mass and a bias spring which is included to urge the stylus against the sample key can be of a low spring constant. The low mass system provides many benefits. Among these are reduced stylus wear, lower displacement forces exerted on the sample key and key blank during scanning and more rapid and arcuate stylus response.

Another feature of the invention is the inclusion of a toggle system within the clamping apparatus. One toggle is included for each vise. The knuckle of each toggle is coupled to the moving support and each toggle moves one of the jaws of the associated vise. Thus, jaw motion begins immediately upon initiation of support table motion. Consequently, positive synchronized coupling is provided and a firm vise closure is provided due to the mechanical advantage provided by a toggle. In practice, it has been found that support motion of less than one quarter of an inch is sufficient to close the vises when utilizing a toggle system.

Still another feature of the invention is the inclusion of a compensation system in the toggle system to compensate for varying thicknesses in sample keys and key blanks. The compensation system includes compression springs coupling the toggle knuckles to the movable support table. The initial support motion closes the vises. Further support table motion necessary to complete the cutting cycle causes a change in the spacing between the support table and the toggle knuckles. This overtravel is absorbed by the compression springs and provides increased vise closure force. Furthermore, the compensation system comprises a bias system that holds the springs substantially compressed even when the toggle is not activated. Thus, immediately upon the impression of a force against the toggle knuckles by the compression springs a high force is provided and thus high initial closure pressure is provided in the vises.

Yet another feature of the invention is the inclusion of an enabling circuit for preventing the operation of the system until a key and a key blank are properly situated in their respective vises. A sample key heel stop within the sample vise includes two electrically conductive heel contact portions that are in electrical contact with the key only when the sample key heel is firmly against the heel stop. In addition, a sample key shoulder stop includes an electrically conductive shoulder contact portion that is in electrical contact with the sample key only when the sample key shoulder is firmly pressed thereagainst. Initiation of machine operation requires that the heel stops and the shoulder stop be electrically connected. This electrical interconnection is provided by a sample key when it is properly placed in the vise. Corresponding contacts associated with the blank vise provide a similar set of contacts that is closed by proper insertion of a key blank. A series enabling circuit insures that both keys are in place prior to machine operation. Furthermore, the key duplicating machine itself is enclosed within a protective cabinet and access to the two vises is provided only through a movable safety gate. An interlock switch, provided in conjunction with the safety gate, is activated only when the gate is closed. The interlock switch is coupled in series with the enabling circuit. Thus, the apparatus can only function when the key and the blank are properly positioned in their respective vises and the safety gate is closed. Thus, dysfunctional duplicate keys are prevented and operators are protected inasmuch as the apparatus cannot be started with the safety gate open. Thus, a highly reliable and safe machine is provided for use by unskilled persons.

Another feature of the invention is the inclusion of a positioning system. The positioning system includes a movable tower disposed adjacent each vise. Projecting from each tower is a plurality of slidably mounted positioning fingers that are biased to project toward the vise opening. The fingers urge the heel of the key or key blank against the respective heel stop and thus help assure proper positioning prior to actuation of the clamping system. Inasmuch as the positioning fingers cover the bitted edge of the sample key and the corresponding edge of the key blank it is necessary that they be removed to a passive position prior to cutting. Consequently, removal takes place shortly after the actuation of the clamping system. A rotating drive shaft supplies power to reciprocate the support table. The positioning towers are coupled to a rack and the drive shaft is selectively coupled by a clutch to a pinion that operates in conjunction with the rack. When the pinion is coupled to the drive shaft the towers are rapidly drawn from the vises. Consequently, the positioning system assures accurate positioning of the key and blank inasmuch as the fingers can adapt to the contoured bitted edge of the sample key and rapid removal of the positioning towers is provided prior to the cutting process.

Yet another feature of the invention is the selective clutch utilized for coupling the pinion to the rotating drive shaft. The clutch includes a slippage system to slip and prevent the engagement of the pinion and the rotating drive shaft in the event that resistance to such engagement is encountered. A clutch control system comprises a withdrawal latch that selectively latches the positioning towers in place. Thus, when the withdrawal latch is activated, the selective clutch will not engage the pinion and the drive shaft. A withdrawal latch release is mounted on the movable support table and engages the withdrawal latch shortly after sufficient table motion has occurred to firmly clamp the vises closed. Thus, the latch is released and the clutch engages the pinion and the rotating drive shaft after the vises are closed. When the towers have receded fully they abut the end of the tracks provided for them and resistance is again sensed by the clutch and the engagement between the pinion and the drive shaft is broken. The rotating drive shaft reverses direction during the second half of the cutting cycle as will be described more fully below. Upon the reversal, the engagement of the pinion and the drive shaft will move the positioning towers up to the active position. However, a blocking member on the support table prevents motion of the towers until the cycle is nearly complete. Only at this time does the clutch engage the pinion and the drive shaft to return the positioning towers to the active position. Thus, positive control of tower movement is provided wherein the tower movement is responsive to the position of the movable support table.

The slippage system in the clutch comprises two concentric facing clutch discs that are movable with respect to each other. One disc is coupled to the pinion and the other is coupled to the rotating drive shaft. A detent defined by one of the discs is periodically aligned with a shaft passing through the other disc. The shaft retains a spring loaded ball. Thus, when the shaft and the detent are aligned the ball is received by the detent. If little torque between the discs is provided the ball remains in the detent and the discs rotate together. That is the case when the towers are free to move. However, when the towers cannot move, as for example during the period when the blocking member engages the towers, a substantial resistance to the rotation of the disc coupled to the pinion is presented. In that event, the disc coupled to the rotating drive shaft continues to rotate and the spring loaded ball moves from the detent and follows a circular path around the stationary facing disc. Thus, an inexpensive reliable clutch is provided to couple the pinion to the rotating drive shaft wherein the coupling is entirely dependent upon the position of the reciprocating support table.

Still another feature of the invention is the inclusion of adjustable bearing pads for leveling and to compensate for wear between the moving support table and the track that guides the support. The adjustable bearing pads are formed of oilite bronze. Thus, a bearing is automatically provided between the track and support. The bronze abuts against an adjustable set screw so that its position is adjustable and thus the support can be readily leveled and compensation made for wear. Tolerances during the manufacture of the machine are less critical inasmuch as the final position of the support table with respect to the track is determined by the adjustment of the bearing pads rather than by the machined surfaces.

DESCRIPTION OF THE DRAWINGS

These and other features and objects of the present invention will become more apparent upon a perusal of the following description taken in conjunction with the accompanying figures wherein:

FIG. 3 is a view of a key with the parts thereof identified;

FIG. 4 is an elevation view of the mechanism of the key duplicating apparatus;

FIG. 5 is a plan view of the subject duplicating apparatus;

FIG. 6 is a detail view of an adjustable bearing pad utilized in the apparatus depicted in FIGS. 4 and 5;

FIG. 7 is a sectional view taken along the lines 7—7 in FIG. 5 showing the bias spring and toggle apparatus utilized to control the vises in the key duplicating apparatus;

FIG. 8 is a sectional view taken along lines 8—8 in FIG. 7 showing a detail of the vise apparatus;

FIG. 9 is a detail elevation view of the vise apparatus;

FIG. 10 is a sectional view of an alternate bias spring apparatus;

FIG. 11 is a sectional elevational view taken along the lines 11—11 in FIG. 5 and shows the mechanism utilized for raising and lowering the positioning towers.

FIG. 12 is a partially sectioned view of the selective clutch apparatus utilized in conjunction with the apparatus depicted in FIG. 11;

FIG. 13 is a detail elevation view showing the juxtaposition of the cutter wheel, blank vise and blank positioning tower in the preferred embodiment;

FIG. 14 is a plan view of a guide plate that guides the motion of the vises and positioning towers;

FIG. 15 is a detail view showing the blank positioning tower in its withdrawn position;

FIG. 16 is an isometric view of an alternate positioning tower;

FIG. 17 is an elevation view of one side of the plate that supports the stylus and cutter wheel;

DESCRIPTION OF THE PREFERRED EMBODIMENT

Figure 1:
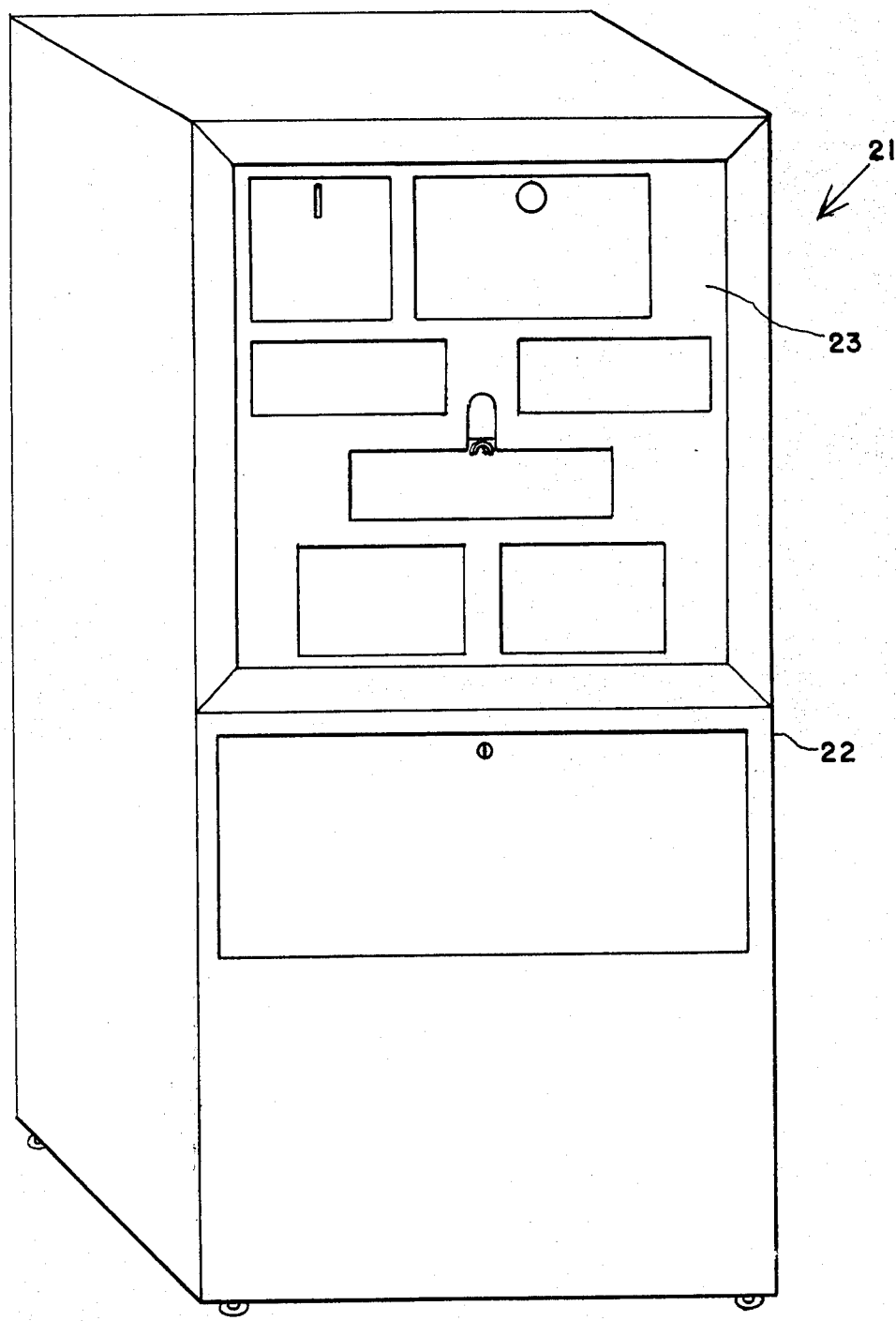
FIG. 1 is an isometric view of a cabinet that is used to house and protect the remaining components of the subject coin operated key duplicating apparatus.

Referring first to FIG. 1 there is shown a coin operated key duplicating machine 21 in a housing 22 of the conventional vending machine variety. A control panel portion 23 is disposed near the upper portion of the housing 22.

Figure 2:
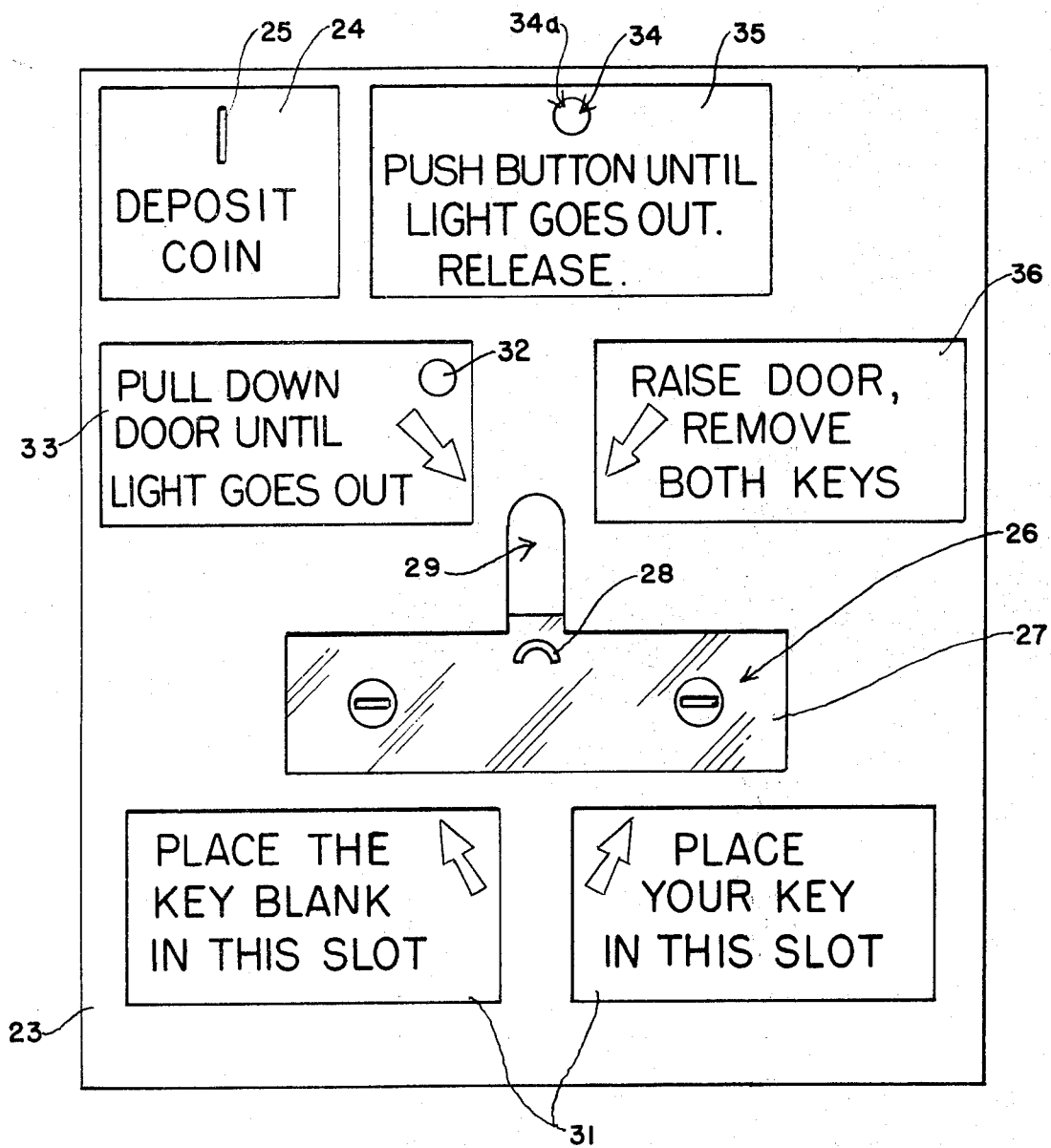
FIG. 2 is a detail view of the control panel of the cabinet in FIG. 1.

Shown in FIG. 2 is a detail view of the control panel 23. A panel 24 in the upper left hand corner includes a coin slot 25 and instructions to deposit a coin therein. Instructions on the panel 24 and the panels to be subsequently described will, in practice, be more complete than shown in FIG. 2. Abbreviated messages are shown to preserve clarity. It is, of course, the deposit of a proper coin that initiates operation of the internal machinery to be described below. In the lower central portion of the control panel 23 is an opening 26 covered by a slidable transparent safety gate 27 that has a handle 28 on its upper portion. The gate 27 slides in an upward direction to uncover the opening 26 when the handle is moved upwardly in a slot 29 defined by the panel 23. Although the gate 27 is shown in the lower position, it normally rests in the upper position thus exposing two openings and two keyways within the opening 26. Thus, the gate 27 can be assumed to be in the open position when a coin is deposited in the slot 25.

When a coin is deposited in the slot 25, a light simultaneously illuminates two panels 31 instructing the customer to place a key blank in one slot in the opening 26 and to place his key to be duplicated in the other opening. The panels 31, like the panels to be described subsequently, are translucent and lettered on the back side. Thus they can only be read when a rear light source is energized. When the key and blank are properly positioned a light 23 in another panel 33 is illuminated. The instructions on the panel 33 instruct the customer to pull the gate 27 down until the light 32 is extinguished. A switch (described below) is actuated when the gate 27 is at the bottom of its motion and the duplication operation is initiated. As will be explained below, at an intermediate point in the machine operation, the machine stops and a light 34 in another panel 35 is illuminated. The light 34 is built into a push button switch 34a. The panel 35 instructs the customer to push the button 34a until the light 34 is extinguished. Actuating the button 34a restarts the machinery. At the completion of the key duplicating cycle, the machine, in a manner described below, stops and a light illuminates another panel 36. The panel 36 instructs the operator to raise the gate 27 and remove both keys. Other switches, to be described below, are actuated when the gate 27 is placed in its uppermost position and thus the internal machinery that will be described below is reset for another cycle.

Referring now to FIG. 3 there is shown a key with the various parts thereof identified. The bow, or handle, provides a convenient place for gripping the key and the heel and the shoulders provide reference surfaces to regulate the position of the key as it is inserted into a keyhole. Keys are supplied with either one or two shoulders. Wards or grooves running longitudinally in a key are used as guides when the key is inserted into a keyhole. The nose with the sloped edge and point aids in initial displacement of the lock tumblers as the key is inserted into a lock. Finally, the bitted edge contains the "combination" of the key and controls the tumblers. It is of course, the object of the subject apparatus to automatically duplicate any given bitted edge.

Referring now to FIGS. 4 and 5 there is shown a key duplicating apparatus 41 on a base 42. The apparatus 41 is within the housing 22. A sample vise 43 receives and retains a sample key to be duplicated. A sample positioning tower 44 aids in the proper positioning of the sample key in the vise 43. Both the vise 43 and the tower 44 are described in greater detail below. Similarly, a key blank vise 45 receives and retains a key blank to be cut and a blank positioning tower 46 aids in the positioning of the blank in the blank vise 45. The vises 43 and 45 are behind the two small openings in the opening 26 (FIG. 2). Two tracks 47 and 48 support a movable support table 49. Four screws 51 passing through slots 52 in the table 49 affix it to the tracks 47 and 48 and restrict the motion of the table thereon to one dimension. The table 49 is leveled and wear in the tracks 47 and 48 is compensated for by means of leveling adjustments 53. A detail of one of the wear and leveling adjustments 53 is shown in FIG. 6. The supporting contact between the table 49 and the track 47 is supplied by an oilite bronze bearing pad 54 set in a cavity 55 in the table. The height of the table 49 is adjustable by a set screw 56. It will be appreciated that foreign matter on the tracks 47 and 48 will be wiped aside by the pads 54 rather than ground in. This wiping action is particularly effective due to the open construction of the apparatus. The pads 54 ride on the flat upper surface of the tracks 47 and 48 rather than in a V groove or the like.

A cutter apparatus 61 including a cutter wheel 62 is mounted on the table 49. Operatively coupled to the cutter is a stylus 63. The cutter wheel 62 is disposed near the blank vise 45 and the stylus 63 is disposed near the sample vise 43. A cutter motor 64 is supported by four pillars 65 on the table 49. The motor shaft 66 is parallel to the direction of motion of the table 49. The cutter 61 will be described in detail below.

When the table 49 is in the extreme left position (as viewed in FIGS. 4 and 5) a switch actuator 67 affixed to the table 49 actuates a button 68 of a reset microswitch 69. Another button 71 of the switch 69 is responsive to a solenoid 72. Similarly, another switch 73 includes buttons 74 and 75 responsive to a table mounted actuator 76 and a solenoid 77 respectively. It will be appreciated that the table 49 must move substantially to the right as viewed in FIG. 4 in order that the button 74 be actuated. Inasmuch as the actuators 67 and 76 are secured to the table 49 by adjustment screws 78 the precise table positions at which the buttons 68 and 74 are actuated is adjustable. The functions of the switches 69 and 73 will be described below.

A reversible main motor 81 is mounted on a vertical support 82 and is coupled to a drive shaft 83 that terminates at one end in a flange 84 in the base 42. The drive shaft 83 supports and drives a worm gear 85. A drive gear 86 is secured to a rotating drive shaft 87 spanning between and rotatable in two anchor blocks 88 and 89 on either end of the base 42. It will be appreciated that one end of the rotating drive shaft 87 comprises a threaded acme screw 91 and the other end comprises a non-threaded shaft 92. A plate 93 affixed to the support table 49 supports a nut 94 that is meshed with the acme screw portion 91. Thus, as the motor 81 rotates the drive shaft 83, the gear 86 and the acme screw portion 91 turn. Consequently, the nut 94 causes motion of the table 49.

A more detailed description of the operation of the apparatus 41 will be given below, but a basic understanding of operation will be helpful at this time. A sample key to be duplicated is inserted into the sample vise 43. A key blank is inserted in the blank vise 45. When this is done, the motors 64 and 81 are started. The cutter wheel 62 is driven by the cutter motor 64 and is responsive to the position of the stylus 63. The table 49 moves to the right as viewed in FIGS. 4 and 5 in response to rotation of the acme screw 91. Upon the initiation of table motion the vise clamps the key and the blank and the towers 44 and 46 recede. As the table 49 moves, the stylus 63 traces the bitted pattern on the sample key. The cutter wheel 62, responding to the position of the stylus 63, duplicates the bitted pattern in the key blank. When the table 49 reaches the extreme right hand position the switch 73 is actuated to stop the motor 81. The motor 81 is reversed and table 49 retracts to the position shown in FIGS. 4 and 5. The cycle is then completed and the vises 43 and 45 release both keys.

Next, the vises 43 and 45 and the methods of clamping the key and key blank therein will be described.

Referring to FIGS. 7, 8 and 9 the sample key vise 43 is shown in detail. The blank vise 45 is identical and thus need not be described. An upper immovable jaw 101 extends upwardly from the base 42 through a guide plate 102 supported by vertical supports 103, only one of which is visible in FIG. 7. Near the upper end of the upper jaw 101 a transverse portion 104 provides an L-shaped cross section as best shown in FIG. 8. However, below the guide plate 102 the transverse portion 104 terminates and the upper jaw 101 becomes a flat bar of metal. (This is best seen in FIG. 11). The jaw block 105 is set in the corner of the upper end of the jaw 101. A movable lower jaw 106 is vertically slidable but horizontally held in position by the combined effects of the corner provided by the L-shaped upper jaw 101 and the tight fit between the lower jaw 106 and the opening in the guide plate 102. The lower end of the slidable lower jaw 106 is pivotally coupled to an upper toggle arm 107 that is coupled at a toggle knuckle 108 to a lower toggle arm 109 that is pivotally coupled to the base 42. The arms 107 and 109 form a toggle 111 that is part of a clamp system that also includes a spring compensator 112.

The toggle knuckle 108 is coupled to the compensator 112 by a rod 113. A compensating spring 114 is retained within a cylinder 115. A plunger portion 116 at one end of the rod 113 acts on one end of the spring 114. The other end of the spring 114 is acted on by an adjustable bias screw 117 in a threaded end of the cylinder 115. The cylinder 115 is affixed to the lower side of the movable support table 49 by a coupling 118.

It will be appreciated that as the table 49 moves to the right (as viewed in FIG. 7) the cylinder 115 is moved to the right and thus force is exerted on the plunger portion 116 and the rod 113. As the toggle knuckle 108 is moved to the right, the lower jaw 106 is forced in an upward direction and the vise 43 is closed. When the vise 43 is closed and the lower jaw 106 can move no farther, further motion of the table 49 is compensated for by compression of the compensation spring 114 as the plunger portion 116 moves toward the interior of the cylinder 115. The adjustable bias screw 117 is set so that the spring 114 is constantly compressed. The effect of precompressing the spring 114 is that once the free travel of the lower jaw 106 is ended by its contact with the block 105, a substantial force is immediately imposed upon the plunger portion 116. Thus, the vise 43 exerts a substantial force immediately upon closing. The components of the clamping system are preferably adjusted so that a table motion of approximately one-eight of an inch will effect closure of the vise. It will be further appreciated that the closure force of the vise 43 is a constantly developing force and increases as the support table 49 moves to the right. A separate toggle and compensation apparatus is utilized for the blank vise 45. Where components of the separate system utilized by the blank vise 45 are shown in other FIGS., they are given reference numerals similar to the corresponding components utilized by the sample vise 43.

Referring now to FIG. 10 there is shown an alternate compensation apparatus 131. The spring 132 is retained in a cavity 133 cast directly in the table 49a. The spring 132 spans between an adjustable bias screw 134 and a plunger portion 135 of a coupling rod 136. Consequently, the system 131 works precisely as does the system 112 except that the rod 136 is only slidable and does not move from what is shown as a parallel relationship with the surface of the table 49a. Consequently, to permit vertical motion of the toggle knuckle 108 during vise closure, a plunger portion 137 is utilized to act on the knuckle. It will be appreciated that the table 49a equipped with the compensation apparatus 131 can be substituted for the compensation apparatus 112 if desired by the user.

Referring again to FIGS. 8 and 9 there is shown the sample vise 43 with a sample key 119 therein. A spacer block 121 of nonconductive material (such as plastic) is affixed to the jaw block 105. It will be noted from FIG. 8 that the vise 43 clamps only a portion of the key 119 near the heel surface. The bitted edge of the key 119 is exposed. Furthermore, it will be noticed in FIG. 9 that the spacer block 121 is thinner than the thinnest key anticipated. Thus, the force caused by vise closure is exerted on the key 119 and not the spacer block. Two contacts 122 and 123 in a heel stop surface 142 of the spacer block 121 contact the heel surface of the key 119. The contacts 122 and 123 are coupled to two wires 124 and 125 respectively. The function of the contacts 122 and 123 will be explained in detail below. It should be appreciated that a properly positioned key 119 contacts both of the contacts 122 and 123.

Also shown in FIG. 8 is a portion of the movable sample positioning tower 44. It will be noted that the shoulder position of the key 119 is established when the shoulder abuts against a shoulder stop 141 on the tower 44. Furthermore, the heel surface of the key 119 is urged against the contacts 122 and 123 in the heel stop surface 142 by a plurality of spring biased independently slidable positioning fingers 143. It is desirable that the fingers 143 be segmented and independently slidable so that the sample key, with its irregular edge, is properly seated. When the vise 43 is open, the lower movable jaw 106 moves only a small distance from the closed position and thus a narrow slot is presented as the key 119 is inserted. The slot is typically only a few thousandths of an inch wider than the key 119. Therefore, the only positioning required to insure proper placement of the key 119 is the urging toward the heel stop surface 142 by the positioning fingers 143 and the pushing of the key in an inward direction until the shoulder contacts the shoulder stop 141.

The positioning towers 44 and 46 will now be described in greater detail with reference to FIGS. 5, 11, 12, 13, 14 and 15.

It was mentioned previously that during the cutting cycle the table 49 and thus the cutting wheel 62 move to the right as viewed in FIG. 5. FIG. 13 is a detail view of the blank vise 45 and positioning tower 46 in juxtaposition with the cutting wheel 62. The cutting wheel 62 is shown in phantom in FIG. 13 at a position near the extreme right end of its travel during the cutting cycle. Comparing FIGS. 5 and 13 it is apparent that were the tower 46 to remain stationary during the entire cutting cycle, the cutting wheel 62 could not move to the position indicated in phantom. It may also be noted from a view of FIG. 5 that were the sample positioning tower 44 to remain stationary, the stylus 63 would collide therewith. Thus the need for the towers 44 and 46 to recede during the cutting cycle will be appreciated.

Referring now to FIG. 11 it is seen that the towers 44 and 46 pass downwardly through openings in the guide plate 102 and that the lower ends of the towers are coupled by cross members 140 and 142 to insure parallelism between the towers. The cross members 140 and 142 cause the towers 44 and 46 to act as a unitary structure. Furthermore, it is seen that the sample tower 44 has a rack 143 set thereinto which mates with a pinion 144 surrounding the rotating drive shaft 92. If the drive shaft 92 rotates the pinion 144 clockwise as viewed in FIG. 11 both towers 44 and 46 will be urged in a downward direction. If the pinion rotates in a counterclockwise direction when the towers are down they are urged in an upward direction. However, it should be emphasized at this time that the pinion 144 is loose with respect to the drive shaft 92 and thus the drive shaft 92 can rotate freely therein.

Referring now to FIG. 12 there is shown a selective clutch 151 that selectively couples the pinion 144 to the rotating drive shaft 92 in response to a clutch control system to be described below. The clutch 151 includes a slippage disc 152 and an output disc 153. The slippage disc 152 is firmly attached to the rotating drive shaft 92 by a set screw 154. The pinion 144 is part of the output disc 153 and, as mentioned previously, the pinion and thus the output disc rotate freely on the drive shaft 92. To prevent the output disc 153 from sliding longitudinally on the rotating drive shaft 92, a collar 155 is affixed to the drive shaft with set screw 156. The clutch 151 comprises a latch 157 for releasably coupling the slippage disc 152 to the output disc 153. The latch includes a detent 158 in the face 159 of the output disc 153 and a ball 161 projecting from a face 162 of the slippage disc 152. The ball 161 is loaded by a spring 163, the force of which is adjustable by a screw 164.

When the slippage disc 152 rotates to a position at which the ball 161 is received by the detent 158 (as shown in FIG. 12) the ball will enter the detent and remain there, thus causing the output disc 153 to turn, if no substantial resistance to the turning is met. Conversely, if the output disc 153, through the pinion 144, is being restrained from rotation, the ball 161 will be received in the detent 158 but as the slippage disc 152 continues to rotate, the ball will be forced from the detent and the slippage disc 152 will rotate independently of the output disc 153.

As mentioned with respect to FIG. 11, the cross members 140 and 142 cause the positioning towers 44 and 46 to act as a unitary structure. Thus, when the towers 44 and 46 are in the position shown in FIG. 11 and the downward motion of either tower is restricted, the ball 161 will not be retained in the detent 152 and thus the clutch 151 will not couple the rotating shaft 92 to the pinion 144. The clutch control system contains a withdrawal latch 171 which is shown in FIG. 13. A spring loaded latch member 172 catches on the guide plate 102 and thus prevents the lowering of the positioning towers 44 and 46. However, as shown in FIGS. 4, 5 and 13, a withdrawal latch release bar 173 is supported by and moved with the support table 49 so that shortly after table motion is initiated the release bar 173 contacts the latch member 172 and forces the member into the latch 171. Consequently, the latch 171 is quickly released. The latch release mechanism is adjusted so that the latch 171 releases simultaneously with or just prior to receipt of the spring loaded ball 161 by the detent 158. Thus, when the ball 161 is received by the detent 158 the resistance to tower motion has been removed and the rotating drive shaft 92 is coupled to the rack 143 by the piston 144. Inasmuch as the shaft 92 rotates in a clockwise direction (FIG. 11) initially, both towers 44 and 46 move to the lowered position in which the tower 46 is depicted in FIG. 15. Upon contact between the lower ends of the towers 44 and 46 and the base 42, the pinion 144 again meets resistance to further rotation and the spring loaded ball 161 is released from the detent 158. Consequently, during each subsequent rotation in the clockwise direction, the spring loaded ball is received and quickly released.

Both the position of the latch release bar 173 and the motion of the towers 44 and 46 are controlled by rotation of the main drive shaft 87. Consequently, the latch release bar 173 continues moving to the right (FIG. 13) while the tower 46 recedes. Therefore, the tower 46 must recede before the bar 173 reaches it. A plan view of the guide plate 102 is shown in FIG. 14. An opening 174 receives the sample vise 43 and an opening 175 receives the sample tower 44. In addition, an opening 176 receives the blank vise 45 and an opening 177 receives the blank tower 46. A match 178 will be observed in one corner of the opening 177. It is this notch 178 through which the latch member 172 passes when the tower 46 is receding. Therefore, the tower 46 begins to recede before the bar 173 reaches it. The apparatus is adjusted so that the tower 46 is fully withdrawn before the bar 173 can collide with it.

When the table 49 reaches the extreme right end of its travel, the reversible motor 81 is reversed and thus the acme screw 91 begins to rotate in the counterclockwise direction. Consequently, the table 49 begins to move to the left toward the position shown in FIGS. 4 and 5. In addition, the rotating shaft 92 begins to rotate counterclockwise as seen in FIG. 11. Thus, when the spring loaded ball 161 is received by the detent 158 the towers 44 and 46 are urged in an upward direction. If a significant resistance to rotation is sensed by the pinion 144, the spring loaded ball 161 will be released from the detent 158. If no resistance is sensed, the ball 161 will remain in the detent 158 and the towers 44 and 46 will raise. Shown in phantom in FIG. 13 are the right hand positions of the cutting wheel 62 and the bar 173. It is clear that during the major portion of the table travel the bar 173 is covering at least a portion of the opening 177. Comparison of FIGS. 13 and 15 shows that the bar 173 functions as a blocking bar, passing into a blocking notch 179 in the tower 46 when the tower is withdrawn. Thus, upon reversal of the motor and the urging of the towers 44 and 46 in the upward direction, the tower 46 is restrained by the blocking bar 173. It is only when the support table 49 is nearing its extreme left hand position and the cutting wheel 62 is clear of the position to be occupied by the tower 46 that the blocking bar 173 is completely removed from the top of the tower 46. Following removal, the spring loaded ball 161 remains in detent 158 when it is next received therein. Consequently, the towers 44 and 46 are moved to their upper positions. When the towers rise, the latch 171 again latches to hold the towers 44 and 46 in the upper position.

To recapitulate, upon initiation of the cutting cycle the towers 44 and 46 remain stationary until the latch member 172 is released by the bar 173. Following latch release, the towers 44 and 46 quickly move to the lower standby position shown in FIG. 15. Upon "bottoming out" the selective clutch 151 releases and remains released during the continued clockwise rotation of the drive shaft 92. Upon reversal of the direction of rotation of the shaft 92, the clutch 151 remains released because the bar 173 is in the notch 179 and thus the motion of the towers 44 and 46 is restricted. Shortly before the completion of the cutting cycle, the towers 44 and 46 become free to move and the clutch 151 raises the positioning towers to the active position.

Referring now to FIG. 16 there is shown an alternate tower embodiment 181, the body 182 of which is round. A block 183 secured to the top of the embodiment 182 includes a shoulder stop 184, a plurality of slidable positioning fingers 185, a blocking notch 186 and an integral rack 187. It will be appreciated that by a suitable change in the openings in the plate 102, the tower 181 can be substituted for the towers 44 and 46. In addition, the lower vise jaws 106 can be round if so desired.

Referring now to FIGS. 4, 5, 17 and 18 there is shown the mounting system utilized for mounting the cutter wheel 62 and the stylus 63. An axle 191 is secured by a block 192 to the table 49. Pivotally mounted on the axle 191 is a mounting plate 193 that supports the cutter wheel 62 and the stylus 63. Observation of FIG. 17 will show that the distance between the center point of the axle 191 and the reference portion 194 of the stylus 63 is equal to the distance between the center point of the axle and the cutting portion 195 of the cutter wheel 62. Thus, it will be appreciated that the reference portion 194 and the cutting portion 195 move in circular paths about the center point of the axle 191 and, inasmuch as the radii are equal, any motion of the reference portion causes a corresponding motion of the cutting portion. It will be further noted that the reference portion 194 is curved to approximate the curvature of the cutter wheel 62. The circular paths are transverse to the one dimensional motion of the table 49. The drive shaft 66 of the cutter motor 64 is coupled by a belt 192 to a drive wheel pulley 197 that is rotatably mounted on the axle 191. A cutter drive shaft 198 couples the pulley 197 to a cutter drive pulley 199. In the preferred embodiment shown the drive pulley 197 and the cutter drive pulley 199 are one piece and therefore the cutter drive shaft 198 is the portion thereof that connects the two pulleys. It should be appreciated however that this need not be so. Furthermore, if it is so desired, the cutter motor 64 can be mounted directly on or in an opening in the table 49 so that the motor drive shaft 66 supports the cutter drive pulley 199 and is aligned with the axle 191.

A cutter drive wheel pulley 201 is coupled to the cutter drive pulley 199 by a drive belt 202. Thus, when the motor 64 is activated, the pulley 20 is driven. The pulley 201 is securely affixed to an axle 203 that passes through a shaft 204 (FIGS. 4 and 5). The axle 203 is affixed to the cutter wheel 62 by a nut 205. Consequently, rotation of the pulley 201 causes rotation of the cutter wheel 62. Therefore, activation of the motor 64 causes rotation of the cutter wheel 62. It will be noted that the axle 203 remains at a fixed distance from the axle 191 so that tension in the belt 202 remains constant at all times during the multidimensional motion of the cutter wheel 62. Mounted on one corner of the plate 193 is a counterweight 206 to compensate for the weight of the shaft 204.

Figure 18:
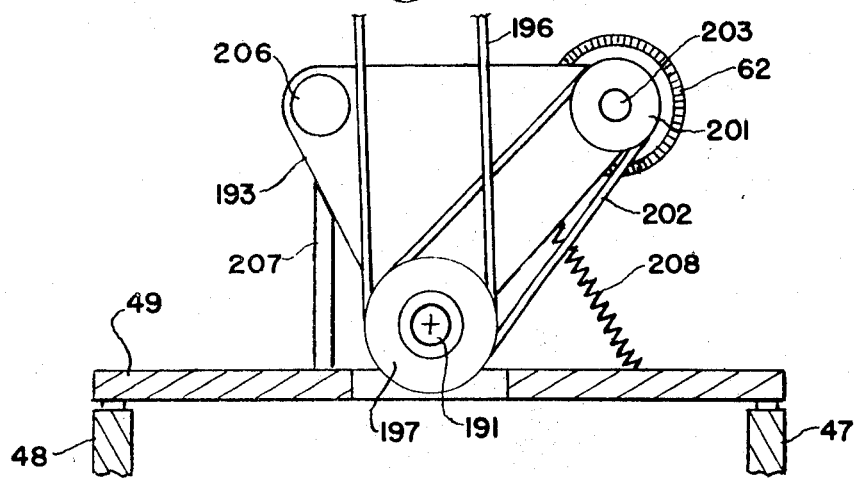
FIG. 18 shows the other side of the plate depicted in FIG. 17.

It will be appreciated that the plate 193 can be treated as a plurality of separate arms. For example, the plate can be treated as comprising a stylus arm which would be the right hand portion of the plate as viewed in FIG. 17 extending from the axle 191 to the stylus 63 and further comprising a cutter arm extending from the axle 191 to the axle 203. The only requirement is, of course, that the two aforementioned arms be fixed with respect to one another. The plate is, in fact, in the claims considered as comprising those two arms. A pillar 207 affixed to the table 49 prevents counterclockwise rotation of the plate 193 (as seen in FIG. 18) past a preselected point. That preselected point is appreciated upon observation of FIG. 5. It is seen that the stylus 63 is not permitted to contact the sample vise 43 but yet is permitted to come close enough thereto that it can correctly follow any anticipated bitted pattern on a key properly inserted in the vise 43. A small bias spring 208 tightly urges the plate 193 toward the pillar 207. The action of a bitted pattern on the stylus 63 easily overcomes the force of the spring 208 and thus the stylus accurately follows the bitted pattern of the key inserted in the vise 43. The spring 208 is not shown in FIG. 4 to preserve clarity.

The electrical control system will now be described.

Figure 19:
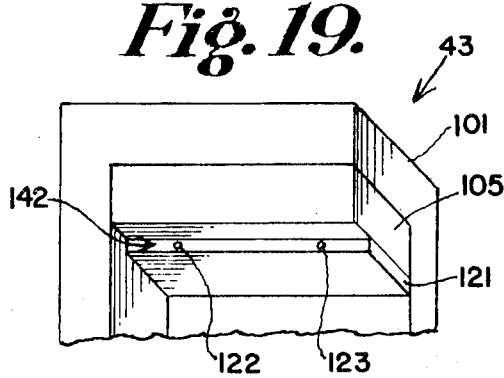
FIG. 19 is an isometric view of the upper jaw of one of the vises showing the electrically conductive contact portions therein.

Referring now to FIG. 19 there is shown the sample vise 43 from a lower angle with the lower jaw 106 removed. The heel stop surface 142 and the first and second contacts 122 and 123 are clearly visible.

Figure 20:
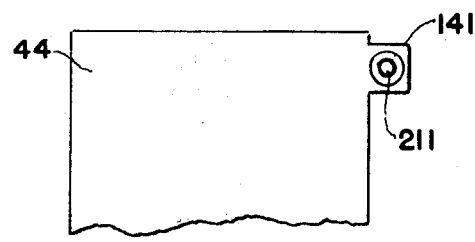
FIG. 20 shows the heel stop on a positioning tower and the electrically conductive contact portion therein.

Referring now to FIG. 20 there is shown a diagram of the sample tower 44 showing the sample shoulder stop 141. In the sample shoulder stop 144 there is an electrically conductive shoulder contact 211.

A comparison of FIGS. 8, 19 and 20 will show that a key, when properly inserted in the sample vise 43, is in electrical contact with all the contacts 122, 123 and 211. It should be understood that three similar contacts are included in the blank vise 45 and blank tower 46 and that a properly inserted key blank is in electrical contact therewith.

Figure 21:
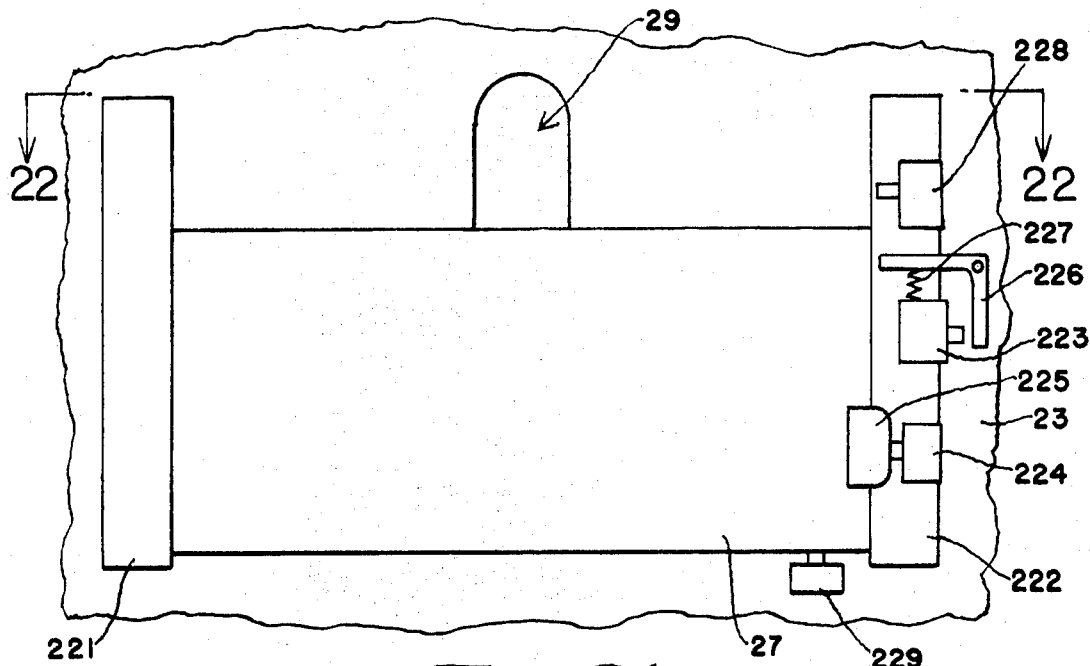
FIG. 21 is a detail view of the mounting system of the safety gate.
Figure 22:
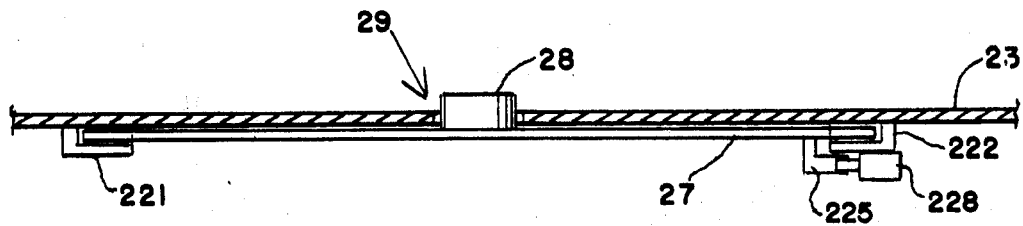
FIG. 22 is a plan view of the safety gate mounting.

Referring now to FIG. 21 there is an interior view of the gate 27. FIG. 22 is a sectional view of the control panel 23 looking down from the top of the gate 27 as indicated by the line 22—22 in FIG. 21. The gate 27 rides in L-shaped guides 221 and 222 that are affixed to the control panel 23. Thus the gate 27 is restricted to vertical motion. The guide 222 supports three switches 223, 224 and 228. An L-shaped member 225 is affixed to the rear of the gate 27 and, as seen most clearly in FIG. 21, comprises a cam shaped actuator portion that actuates the switches 223 and 228 as the gate 27 is vertically moved. As seen in FIG. 21, the switch 224 is activated when the gate 27 is at the lower portion of its motion. Also, a switch 229, mounted on the panel 23, is activated when the gate 27 is in its lowest position. Just prior to reaching the upper end of gate travel, the switch 228 is activated and remains activated at the uppermost position of the gate travel due to the relatively wide lobe of the L-shaped cam actuator 225.

An L-shaped member 226 is pivotally mounted and is biased by a small spring 227 to retain its legs in generally vertical and horizontal positions. It will be appreciated that as the gate 27 moves in an upward direction the actuator 225, via the member 226, actuates the switch 223. As the gate 27 moves in a downward direction, the L-shaped member 226 is moved in a counterclockwise direction and the spring 227 is compressed, but the switch 223 is not activated.

Figure 23:
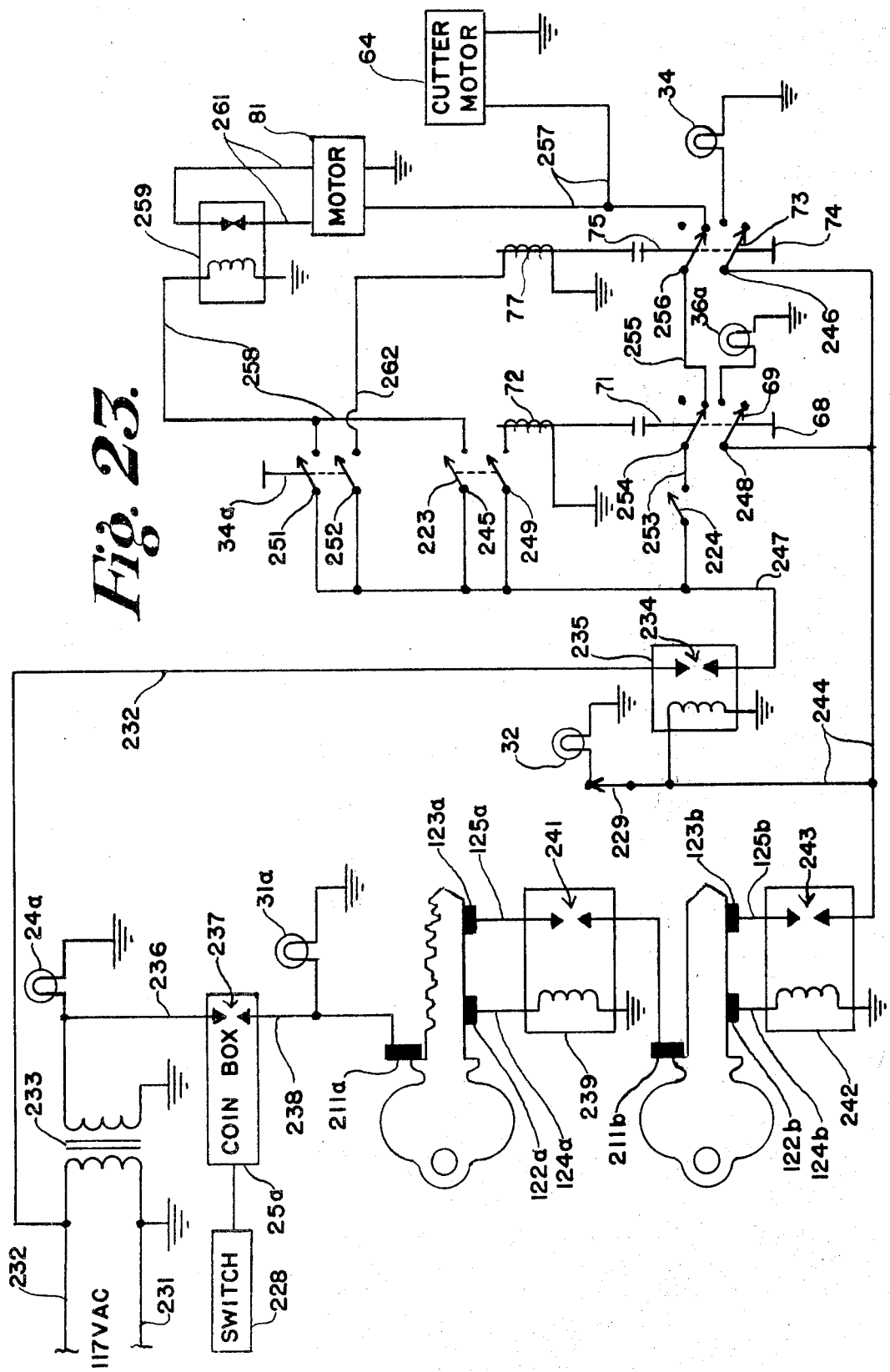
FIG 23 is a schematic diagram of the electrical circuitry utilized to control the subject apparatus.

Referring now to FIG. 23 there is shown a schematic diagram of the circuitry of the automatic key duplicating machine 41. One line 231 of a 117 volt ac input is grounded. The other line 232 is coupled to the primary winding of a stepdown transformer 233 and to a set of normally open contacts 234 in a relay 235. One side of the low voltage output of the stepdown transformer 233 is grounded and the other side is coupled to a line 236 that energizes a light 24a that illuminates the panel 24 (FIG. 2). The line 236 is also coupled to a set of contacts 237 within a coin collection box 25a that receives coins that are deposited in the slot 35 (FIG. 2). When a coin is received by the coin box 25a, the contacts 237 are closed and a line 238 energizes a light 31a that illuminates the panels 31 (FIG. 2). The contacts 237 remain closed until an appropriate signal is received from the switch 228.

The line 238 is also coupled to a shoulder contact 211a in the sample tower 44. The contact 211a is in electrical contact with the shoulder of a sample key to be duplicated when the key is properly positioned in the vise 43. Also, when the key is properly positioned in the vise 43, a first heel contact 122a, through a line 124a, energizes the coil of a sample relay 239. The normally open contacts 241 of the relay 239 receive power from a second heel contact 123a via a line 125a. For the sake of safety, it is this low voltage output from the transformer 233 that is passed through the key. When the contacts 241 are closed, power on the line 125a is passed to a blank shoulder contact 211b in the blank tower 46. When a blank is properly positioned in the vise 45, power is received by a first heel contact 122b and passed by a line 124b to energize a blank relay 242. The normally open contacts 243 of the relay 242 are coupled by a line 125b to a second blank heel contact 123b. The output of the contacts 243 is coupled by a line 244 to energize the coil of the relay 235 and to energize, via the normally closed switch 229, the light 32 in the panel 33 (FIG. 2). The line 244 is also coupled to a common contact 245 of the switch 69 (FIG. 4) and a common contact 246 of the switch 73.

A line 247 receives the output of the contacts 234 of the relay 235 and is coupled to the common contact of the switch 224. The line 247 is also coupled to common terminals 248 and 249 of the switch 223 and to common terminals 251 and 252 of the switch 34a.

The output of the switch 224 is coupled by a line 253 to a terminal 254 in the switch 69 (FIG. 4). When the switch 69 is in the position shown in FIG. 23, the terminal 254 is coupled to a line 225 and thence to a contact 256 in the switch 73 (FIG. 4). When the switch 73 is in the position shown in FIG. 23, energy received at the terminal 256 is passed by a line 257 to the main motor 81 and the cutter motor 64.

When the switch 223 is closed, energy received by the contact 249 actuates the solenoid 72 (FIG. 4) and energy received by the contact 248 is passed by a line 258 to an impulse relay 259. The impulse relay 259 changes its state whenever a pulse is received on the line 258. The contacts of the relay 259 alternately couple and uncouple two direction controlling leads 261 of the main motor 81. When the controls are closed and thus the lines 261 connected, the motor 81 operates in the forward direction and when the contacts are open the motor operates in the reverse direction. When the switch 34a (FIG. 2) is closed energy received by the contact 252 carried by a line 262 to actuate the solenoid 77 (FIG. 4). Energy received by the contact 251 is coupled to the line 258 to change the state of the relay 259.

In summary, operation proceeds as follows. Initially, all switches and relays are set as shown in FIG. 23 and the safety gate 27 is up. An operator inserts the appropriate coin in the coin slot 25 and it is received by the coin collection box 25a. The contacts 237 close illuminating the panels 31 (FIG. 2). In response to the panels 31, the operator places his key to be duplicated and the key blank in the appropriate vises through the opening 26. It will be appreciated from observation of FIG. 23 that only when both the key and the key blank are in contact with all three of the associated contacts will both the relays 239 and 242 be actuated and will power appear on the line 244.

When power does appear on the line 244 the lamp 32 is illuminated through the normally closed switch 229 and the relay 235 closes thus applying 117 volts ac to the line 247. When the gate 27 is drawn down, in response to the light 32 (FIG. 2), the switch 229 is opened and thus the light 32 is extinguished. Also, with the gate 27 in its lowest position, the switch 224 is closed and, inasmuch as the switches 69 and 73 are presently in the positions shown in FIG. 23, the main motor 81 and the cutter motor 64 start. Since the lines 261 are now connected by the relay 259, the main motor 81 operates in the forward direction. Therefore, as explained previously, the vises 43 and 45 are quickly clamped and the positioning towers 44 and 46 rapidly recede. During the first half of the cutting cycle, the table 49 traverses to the right (as viewed in FIG. 4). When the table 49 has reached its extreme rightward motion, the actuator 76 (FIG. 4) moves the switch 73 into the position opposite that shown in FIG. 23.

When the switch 73 is moved, the contact 256 is disconnected from the line 257 and thus the cutter motor 64 and the main motor 81 stop. Furthermore, the contact 246 energizes the lamp 34. Referring to FIG. 2 it will be recalled that the lamp 34 instructs the operator to push the button 34a. As seen in FIG. 23, actuating the switch 34a couples the contact 251 to the relay 259 so that the relay changes state. Consequently, the lines 261 are disconnected from each other and the motor 81 is set to operate in the reverse direction. Furthermore, actuation of the switch 34a couples the contact 252 to the line 262 and thus actuates the solenoid 77 resetting the switch 73 to the position shown in FIG. 23. Resetting of the switch 73 extinguishes the light 34 and reconnects the contact 256 to the motors 64 and 81 thus restarting them. Inasmuch as the main motor 81 has been reversed, the table 49 proceeds to the left (as viewed in FIG. 4) until the actuator 67 (FIG. 4) contacts the switch 69. At that time the contact 254 is disconnected from the line 255 and thus the motors 64 and 81 stop. Furthermore, the switch 69, when in the position opposite that shown in FIG. 23, couples the contact 245 to the light 36a, thus illuminating the light.

When the light 36a is illuminated, the panel 36 (FIG. 2) instructs the operator to raise the gate 27 and remove both keys. It will be appreciated that when the gate 27 is raised, the switch 224 is deactivated and, at an intermediate position in the raising of the gate, the actuator 225 strikes the member 226 (FIG. 21) to actuate the switch 223. Actuation of the switch 223 couples the contact 248 to the relay 259 and thus connects the lines 261 to set the main motor 81 for forward operation in preparation for the following cycle. Furthermore, the contact 249 is coupled to the solenoid 72 to reset the switch 69 for the next cycle. Upon completion of the door raising, the switch 228 is activated and the coin collection box 25a deposits the coin and is prepared for the following cycle. Thus, following the raising of the gate 27 all switches are as shown in FIG. 23 and the machine 21 is ready for the deposit of another coin to start the cycle anew.

Obviously, many modifications and variations of the present invention are possible in light of the above teachings. For example, the cutter wheel 62 could be stationary and the vises 43 and 45 could move one dimensionally with respect thereto. Or, a single drive motor and drive shaft could be utilized to drive the cutter wheel 62 directly and drive the table 49 via pulleys. It is to be understood, therefore, that the invention can be practiced otherwise than as specifically described.

What is claimed is:
1. A key duplicating machine comprising:
a base;
a sample vise for receiving and retaining a sample key to be duplicated;
a blank vise for receiving and retaining a blank key;
clamp means for opening and closing said sample vise means and said blank vise means, said clamp means comprising spring compensation means for variably yielding to closure forces on said clamp means so as to accommodate sample keys and key blanks of different thickness inserted in said vises, said clamp means further comprising toggle joint means for exerting closure forces on said vises; said toggle joint means comprising a pair of toggle links, one having one end secured to said base and another having one end secured to said vise means, and a pivot connection between the opposite ends of said one and another toggle links;
adjustable bias means for preloading said spring compensation means so as to provide an adjustable, predetermined initial contact pressure in said vise means; and
drive means for applying closure forces to said clamp means.

2. A machine according to claim 1 wherein said spring compensation means comprises a spring member exerting a force against said pivot connection between said toggle links.

3. A machine according to claim 2 wherein said adjustable bias means comprises set screw means for adjusting the compression force on said spring member.

4. A machine according to claim 1 wherein said clamp means comprises a pair of said toggle joint means, one connected to each of said vises, said spring compensation means comprises a spring compensator for each of said toggle joint means, and said bias means comprises a bias member for each of said spring compensators.

5. A machine according to claim 4 wherein each of said spring compensators comprises a spring member exerting a force against said pivot connection between said toggle links.

6. A machine according to claim 5 wherein each of said adjustable bias members comprises set screw means for adjusting the compression force on said spring member.

* * * * *